United States Patent
Eddy et al.

(10) Patent No.: US 6,606,215 B1
(45) Date of Patent: Aug. 12, 2003

(54) COMPENSATION FOR REPEATABLE RUNOUT ERROR

(75) Inventors: Kyle K. Eddy, Minneapolis, MN (US); John C. Morris, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/370,823

(22) Filed: Aug. 9, 1999

Related U.S. Application Data (60) Provisional application No. 60/121,165, filed on Feb. 22, 1999.

(51) Int. Cl.$^7$ ................................................. G11B 5/596
(52) U.S. Cl. ..................................................... 360/77.04
(58) Field of Search ........................... 360/77.04, 77.08, 360/77.09, 78.04, 77.02, 75

(56) References Cited

U.S. PATENT DOCUMENTS

| | | | |
|---|---|---|---|
| 3,725,764 A | 4/1973 | Oswald | 318/629 |
| 3,863,124 A | 1/1975 | Pierce et al. | 318/638 |
| 3,914,541 A | 10/1975 | Elliott | 178/6.6 |
| 4,030,132 A | 6/1977 | Iftikar et al. | 360/78 |
| 4,103,314 A | 7/1978 | Case | 360/78 |
| 4,135,217 A | 1/1979 | Jacques et al. | 360/77 |
| 4,149,199 A | 4/1979 | Chick et al. | 360/77 |
| 4,217,612 A | 8/1980 | Matla et al. | 360/78 |

(List continued on next page.)

FOREIGN PATENT DOCUMENTS

| | | |
|---|---|---|
| DE | 3900683 A | 1/1989 |
| DE | 197 15 678 A1 | 10/1997 |
| EP | 0 130 248 A1 | 1/1985 |
| EP | 0 540 114 A1 | 5/1993 |
| EP | 0 549 814 A1 | 7/1993 |
| GB | 2 060 217 A | 4/1981 |
| GB | 1713268 | 3/1991 |
| WO | WO 91/06096 | 5/1991 |
| WO | WO 93/06595 | 4/1993 |
| WO | WO 97/45833 | 12/1997 |

OTHER PUBLICATIONS

*Recording Properties of Multilayered Thin Film Media*, by D.C. Palmer, K.E. Johnson, E.Y. Wu, and J.V. Peske, IEEE Transactions On Magnetics, vol. 27, No. 6, Nov. 1991, pp. 5307–5309.

(List continued on next page.)

*Primary Examiner*—Andrew L. Sniezek
(74) *Attorney, Agent, or Firm*—Westman, Champlin & Kelly, P.A.

(57) ABSTRACT

A disc drive having a servo loop for positioning a head over a disc includes a servo controller which generates a servo control signal in response to a received position error signal. An actuator, coupled to the servo controller, moves the head in response to the servo control signal. A sensor, located in the head, senses servo information located on the disc and produces a servo signal therefrom. The servo signal is combined with a reference signal to produce the position error signal. A compensation storage device stores decimated compensation values and a servo compensator expands the decimated compensated values and injects the expanded compensation values into the servo loop.

18 Claims, 7 Drawing Sheets

U.S. PATENT DOCUMENTS

| | | | |
|---|---|---|---|
| 4,314,295 A | 2/1982 | Frandsen | 360/106 |
| 4,329,712 A | 5/1982 | Lang | 358/128.5 |
| 4,355,266 A | 10/1982 | Pearson | 318/85 |
| 4,371,960 A | 2/1983 | Kroiss | 369/43 |
| 4,396,961 A | 8/1983 | Prasad et al. | 360/78 |
| 4,414,589 A | 11/1983 | Oliver et al. | 360/77 |
| 4,456,934 A | 6/1984 | Wedman et al. | 360/78 |
| 4,485,418 A | 11/1984 | Bremmer | 360/77 |
| 4,497,047 A | 1/1985 | Fujiie et al. | 369/45 |
| 4,513,333 A | 4/1985 | Young et al. | 360/77 |
| 4,524,397 A | 6/1985 | Chalmers et al. | 360/77 |
| 4,562,494 A | 12/1985 | Bond | 360/75 |
| 4,575,776 A | 3/1986 | Stephens et al. | 360/78 |
| 4,605,977 A | 8/1986 | Matthews | 360/103 |
| 4,616,276 A | 10/1986 | Workman | 360/77 |
| 4,620,244 A | 10/1986 | Krause | 360/77 |
| 4,620,252 A | 10/1986 | Bauck et al. | 360/106 |
| 4,633,345 A | 12/1986 | Keener | 360/77 |
| 4,636,885 A | 1/1987 | Yamada et al. | 360/78 |
| 4,677,602 A | 6/1987 | Okano et al. | 369/32 |
| 4,679,103 A | 7/1987 | Workman | 360/77 |
| 4,697,127 A | 9/1987 | Stich et al. | 318/561 |
| 4,697,213 A | 9/1987 | Kitamura | 360/78 |
| 4,706,250 A | 11/1987 | Patel | 371/39 |
| 4,727,533 A | 2/1988 | Erbert | 369/112 |
| 4,764,860 A | 8/1988 | Takao | 369/43 |
| 4,786,990 A | 11/1988 | Overton et al. | 360/65 |
| 4,788,608 A | 11/1988 | Tsujisawa | 360/77 |
| 4,791,599 A | 12/1988 | Hethuin et al. | 364/728.07 |
| 4,803,572 A | 2/1989 | Haruna et al. | 360/60 |
| 4,816,938 A | 3/1989 | Cowen et al. | 360/75 |
| 4,822,139 A | 4/1989 | Yoshizumi | 350/257 |
| 4,878,135 A | 10/1989 | Makino et al. | 360/78.04 |
| 4,890,172 A | 12/1989 | Watt et al. | 360/77.04 |
| 4,897,840 A | 1/1990 | Weiss et al. | 371/40.1 |
| 4,924,165 A | 5/1990 | Kohno | 318/592 |
| 4,947,272 A | 8/1990 | Yokozawa | 360/77 |
| 4,956,831 A | 9/1990 | Sarraf et al. | 369/32 |
| 4,965,782 A | 10/1990 | Mathews | 369/48 |
| 5,046,060 A | 9/1991 | Chow et al. | 369/44.32 |
| 5,055,731 A | 10/1991 | Nihei et al. | 310/309 |
| 5,056,074 A | 10/1991 | Tateishi et al. | 369/44.28 |
| 5,062,023 A | 10/1991 | Squire | 360/78.04 |
| 5,073,885 A | 12/1991 | Ito et al. | 369/44.28 |
| 5,081,552 A | 1/1992 | Glaser et al. | 360/98.01 |
| 5,089,757 A | 2/1992 | Wilson | 318/560 |
| 5,122,718 A | 6/1992 | Sawata | 318/621 |
| 5,146,372 A | 9/1992 | Cronch et al. | 360/51 |
| 5,155,422 A | 10/1992 | Sidman et al. | 318/560 |
| 5,161,077 A | 11/1992 | Jabbari | 360/106 |
| 5,164,863 A | 11/1992 | Janz | 360/57 |
| 5,185,681 A | 2/1993 | Volz et al. | 360/77.05 |
| 5,187,620 A | 2/1993 | Notake et al. | 360/77.04 |
| 5,189,578 A | 2/1993 | Mori et al. | 360/106 |
| 5,197,058 A | 3/1993 | Bell, Jr. et al. | 369/44.28 |
| 5,198,948 A | 3/1993 | Stover et al. | 360/124 |
| 5,204,793 A | 4/1993 | Plonczak | 360/97.01 |
| 5,216,559 A | 6/1993 | Springer | 360/106 |
| 5,233,487 A | 8/1993 | Christensen et al. | 360/77.04 |
| 5,241,433 A | 8/1993 | Anderson et al. | 360/77.04 |
| 5,247,501 A | 9/1993 | Hashimoto et al. | 369/44.11 |
| 5,257,149 A | 10/1993 | Meyer | 360/78.14 |
| 5,270,885 A | 12/1993 | Satoh et al. | 360/77.04 |
| 5,274,511 A | 12/1993 | Ikeda | 360/55 |
| 5,287,225 A | 2/1994 | Sukigara | 360/31 |
| 5,287,234 A | 2/1994 | Suzuki | 360/78.04 |
| 5,299,026 A | 3/1994 | Vincett et al. | 358/401 |
| 5,303,105 A | 4/1994 | Jorgenson | 360/106 |
| 5,305,160 A | 4/1994 | Funches et al. | 360/78.07 |
| 5,311,378 A | 5/1994 | Williams et al. | 360/77.03 |
| 5,367,513 A | 11/1994 | Bates et al. | 369/44.29 |
| 5,379,171 A | 1/1995 | Morehouse et al. | 360/10.5 |
| 5,400,201 A | 3/1995 | Pederson | 360/135 |
| 5,404,253 A | 4/1995 | Painter | 360/77.04 |
| 5,416,658 A | 5/1995 | Sega et al. | 360/106 |
| 5,444,582 A | 8/1995 | Suzuki | 360/78.09 |
| 5,444,583 A | 8/1995 | Ehrlich et al. | 360/78.09 |
| 5,455,724 A | 10/1995 | Suzuki et al. | 360/77.04 |
| 5,465,182 A | 11/1995 | Ishikawa | 360/75 |
| 5,465,183 A | 11/1995 | Hattori | 360/78.9 |
| 5,521,773 A | 5/1996 | Suzuki et al. | 360/77.04 |
| 5,521,778 A | 5/1996 | Boutaghou et al. | 360/106 |
| 5,523,902 A | 6/1996 | Pederson | 360/77.8 |
| 5,535,072 A | 7/1996 | Witt et al. | 360/99.06 |
| 5,539,714 A | 7/1996 | Andrews, Jr. et al. | 369/44.26 |
| 5,541,784 A | 7/1996 | Cribbs et al. | 360/75 |
| 5,550,685 A | 8/1996 | Drouin | 360/77.08 |
| 5,553,086 A | 9/1996 | Sompel et al. | 371/47.1 |
| 5,576,909 A | 11/1996 | Dierkes et al. | 360/78.09 |
| 5,585,976 A | 12/1996 | Pham | 360/77.04 |
| 5,602,689 A | 2/1997 | Kadlec et al. | 360/78.04 |
| 5,608,586 A | 3/1997 | Sri-Jayantha et al. | 360/77.04 |
| 5,610,487 A | 3/1997 | Hutsell | 318/560 |
| 5,610,777 A | 3/1997 | Dang et al. | 360/77.03 |
| 5,638,230 A | 6/1997 | Kadlec | 360/78.04 |
| 5,646,797 A | 7/1997 | Kadlec et al. | 360/75 |
| 5,648,738 A | 7/1997 | Welland et al. | 327/307 |
| 5,675,450 A | 10/1997 | Kadlec | 360/78.09 |
| 5,677,809 A | 10/1997 | Kadlec | 360/780.09 |
| 5,680,272 A | 10/1997 | Kadlec et al. | 360/78.04 |
| 5,684,650 A | 11/1997 | Kadlec et al. | 360/77.06 |
| 5,706,265 A | 1/1998 | Bang | 369/50 |
| 5,708,581 A | 1/1998 | Martinez | 364/164 |
| 5,754,354 A | 5/1998 | Tomita et al. | 360/61 |
| 5,774,294 A | 6/1998 | Fioravanti | 360/75 |
| 5,774,297 A | 6/1998 | Hampshire et al. | 360/77.04 |
| 5,777,816 A | 7/1998 | Hampshire et al. | 360/77.08 |
| 5,793,559 A | 8/1998 | Shepherd et al. | 360/78.09 |
| 5,796,535 A | 8/1998 | Tuttle et al. | 360/51 |
| 5,796,542 A | 8/1998 | Szeremeta | 360/77.02 |
| 5,815,332 A | 9/1998 | Suzuki et al. | 360/48 |
| 5,822,147 A | 10/1998 | Kisaka | 360/77.08 |
| 5,825,578 A | 10/1998 | Shrinkle et al. | 360/77.08 |
| 5,826,338 A | 10/1998 | Chilton et al. | 30/90.1 |
| 5,828,515 A | 10/1998 | Kim | 360/78.06 |
| 5,835,300 A | 11/1998 | Murphy et al. | 360/77.05 |
| 5,835,302 A | 11/1998 | Funches et al. | 360/78.07 |
| 5,844,743 A | 12/1998 | Funches | 360/78.04 |
| 5,854,722 A | 12/1998 | Cunningham et al. | 360/77.04 |
| 5,883,749 A | 3/1999 | Park | 360/75 |
| 5,886,846 A | 3/1999 | Pham et al. | 360/78.04 |
| 5,898,286 A | 4/1999 | Clare et al. | 318/569 |
| 5,926,338 A | 7/1999 | Jeon et al. | 360/77.04 |
| 5,940,239 A | 8/1999 | Lee et al. | 360/77.02 |
| 5,940,240 A | 8/1999 | Kupferman | 360/78.08 |
| 5,949,605 A | 9/1999 | Lee et al. | 360/77.04 |
| 5,949,608 A | 9/1999 | Hunter | 360/78.09 |
| 5,956,201 A | 9/1999 | Pham et al. | 360/78.09 |
| 5,969,494 A | 10/1999 | Kang | 318/610 |
| 5,978,169 A * | 11/1999 | Woods | 360/77.04 |
| 6,069,764 A * | 5/2000 | Morris et al. | 360/77.04 |
| 6,097,565 A | 8/2000 | Sri-Jayantha et al. | 360/78.09 |
| 6,115,203 A | 9/2000 | Ho et al. | 360/77.04 |
| 6,141,175 A | 10/2000 | Nazarian et al. | 360/77.04 |
| 6,310,742 B1 | 10/2001 | Nazarian et al. | 360/77.04 |

OTHER PUBLICATIONS

*Evolution of the Soft Error Bate Model*, by P. Hardy and D.J. Malone, IEEE Transactions On Magnetics, vol. 27, No. 6, Nov. 1991, pp. 5313–5315.

*Error Rate Performance of Experimental Gigabit Per Square Inch Recording Components*, by T.D. Howell, D.P. McCown, T.A. Diola, Y. Tang, K.R. Hense, and R.L. Gee, IEEE Transactions On Magnetics, vol. 26, No. 5, Sep. 1990, pp. 2298–2302.

*A Track Density Model for Magnetoresistive Heads Considering Erase Bands*, by J.K. Lee and P.I. Bonyhard, IEEE Transactions On Magnetics, vol. 26, No. 5, Sep. 1990, pp. 2475–2477.

*Demonstration Of 500 Megabits Per Square Inch With Digital Magnetic Recording*, by Roy A. Jensen, Joost Mortelmans, and Robin Hauswitzer, IEEE Transactions On Magnetics, vol. 26, No. 5, Sep. 1990, pp. 2169–2171.

*IBM's Next Generation Magnetoresistive Heads*, 1987.

*Magnetoresistive Read Magnetic Recording Head Offtrack Performance Assessment*, by P.I. Bonyhard and J.K. Lee, IEEE Transactions On Magnetics, vol. 26, Nov. 1990, pp. 2448–2450.

*Design Issues For Practical Rigid Disk Magnetoresistive Heads*, by P.I. Bonyhard. IEEE, Transactions On Magnetics, vol. 26, No. 6, Nov. 1990, pp. 3001–3003.

*TMR and Squeeze at Gigabit Areal Densities*, by Patrick C. Arnett and Don McCown, IEEE Transactions On Magnetics, vol. 28, No. 4, Jul. 1992, pp. 1984–1986.

*Window–Shifting Mechanism In Data Separator*, IBM Technical Disclosure Bulletin, vol. 30, No. 6, Nov. 1987.

"Automated Tuning Concepts for Interative Learning and Repetitive Control Laws" by R. Longman et al., *Proceedings of the $37^{th}$ IEEE Conference on Decision and Control*, pp. 192–198, (Aug. 1998).

* cited by examiner

COMPENSATION FOR REPEATABLE RUNOUT ERROR

REFERENCES TO RELATED APPLICATION

This application claims a priority benefit from a U.S. provisional application having Ser. No. 60/121,165, entitled DECIMATION OF WRITTEN-IN ERROR COMPENSATION TABLES IN AN EMBEDDED SERVO DISC-DRIVE, and filed on Feb. 22, 1999.

FIELD OF THE INVENTION

The present invention relates to servo systems in disc drives. In particular, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as a track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high frequency changes in the path defined by the servo fields.

Written-in errors are often referred to as repeatable runout errors because they cause the same errors each time the head passes along a track. As track densities increase, these repeatable runout errors begin to limit the track pitch. Specifically, variations between the ideal track path and the actual track path created by the servo fields can result in an inner track path that interferes with an outer track path. This is especially acute when a first written-in error causes a head to be outside of an inner track's ideal circular path and a second written-in error causes the head to be inside of an outer track's ideal circular path. To avoid limitations on the track pitch, a system is needed to compensate for repeatable runout errors.

The written-in errors can be compensated using stored compensation values which are used as additional inputs, into the servo loop. However, sufficient memory is required to store all of the compensation values.

The present invention addresses these and other problems, and offers other advantages over the prior art.

SUMMARY OF THE INVENTION

The present invention relates to disc drives that have compensation for repeatable runout errors which address the above mentioned problems.

In accordance with one embodiment of the invention, a disc drive having a servo loop for positioning a head over a disc. The servo loop includes a servo controller which generates a servo control signal in response to a received position error signal and an actuator, coupled to the servo controller is capable of moving the head in response to the servo control signal. A sensor, located in the head, is capable of sensing servo information located on the disc and producing a servo signal therefrom. The servo signal is combined with a reference signal to produce the position error signal. A compensation storage device stores decimated compensation values and a servo compensator is adapted to expand the decimated compensated value and inject the expanded compensation value into the servo loop.

DETAILED DESCRIPTION OF THE PREFERRED EMBODIMENTS

Figure 1:
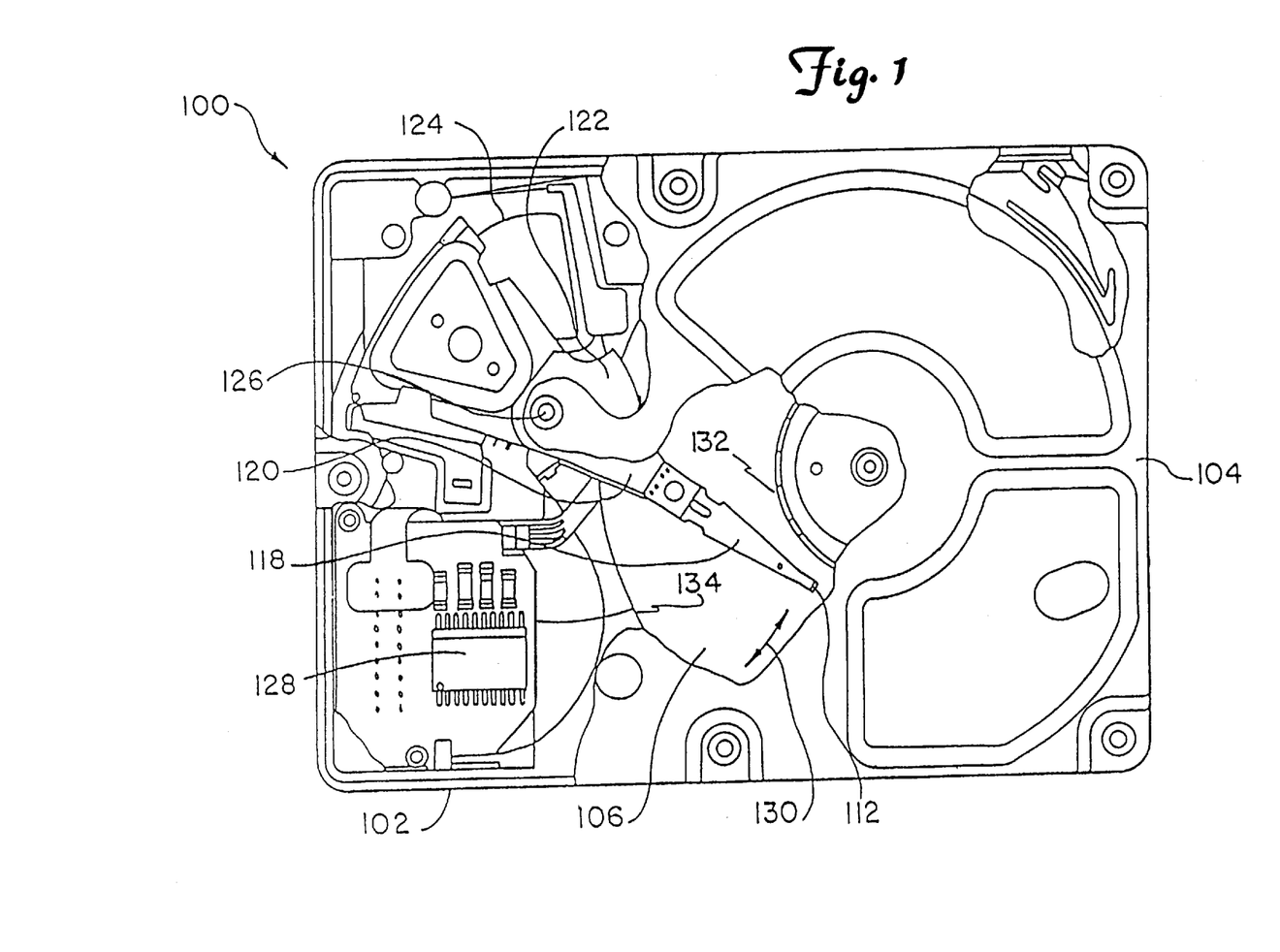
FIG. 1 is a plan view of a disc drive of the present invention.

Referring now to FIG. 1, a plan view of a disc drive 100 is shown that includes a housing with a base plate 102 and a top cover 104 (sections of top cover 104 are removed for clarity). Disc drive 100 further includes a disc pack 106, which is mounted on a spindle motor (not shown). Disc pack 106 can include a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120 known generally as a fixture, of an actuator assembly 122.

Actuator assembly 122 is rotated about a shaft 126 by a voice coil motor 124, which is controlled by servo control circuitry within internal circuit 128. HGA 112 travels in an arcuate path 130 between a disc inner diameter 132 and a disc outer diameter 134. When the head is properly positioned, write circuity within internal circuitry 128 encodes data for storage on the disc and sends an encoded signal to the head in HGA 112, which writes the information to the disc. At other times, the read head in HGA 112 reads stored information from the disc and provides a recovered signal to detector circuitry and decoder circuitry within internal circuitry 128 to produce a recovered data signal.

Figure 2:
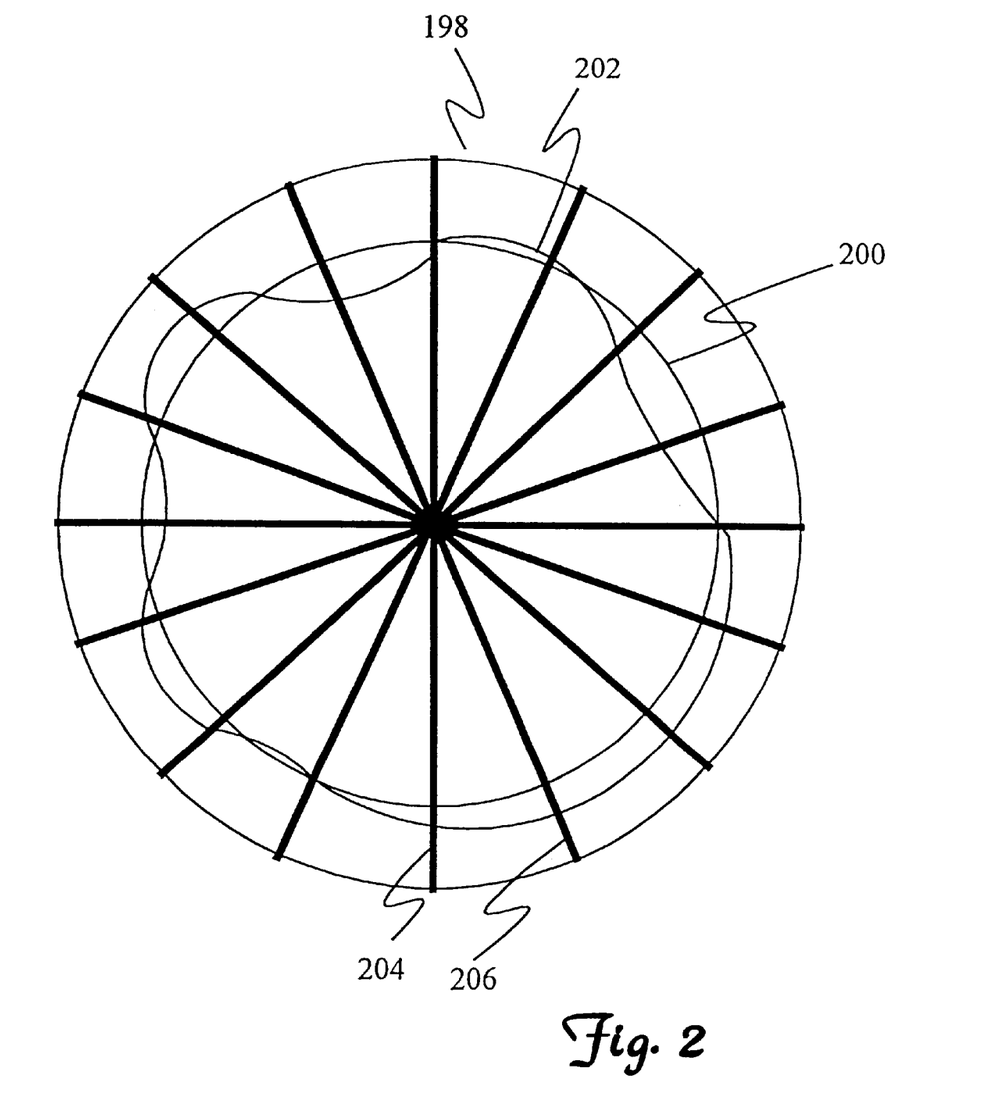
FIG. 2 is a top view of a section of a disc showing an ideal track and a realized written-in track.

FIG. 2 is a top view of a section 198 of a disc 201 showing an ideal, perfectly circular track 200 and an actual track 202. Section 198 includes a plurality of radially extending servo fields such as servo fields 204 and 206. The servo fields include servo information that identifies the location of actual track 202 along disc section 198.

Any variation in the position of a head away from circular track 200 is considered a position error. The portions of track 202 that do not follow circular track 200 create written-in repeatable runout position errors. A position error is considered a repeatable runout error if the same error occurs each time the head passes a particular circumferential location on the disc. Track 202 creates a repeatable runout error because each time a head follows the servo fields that define track 202, it produces the same position error relative to ideal track 200.

Under the present invention, a head attempting to write to or read from track 202 will not follow track 202 but instead will more closely follow perfectly circular track 200. This is accomplished using a compensation signal that prevents the servo system from tracking repeatable runout errors resulting from the irregular shape of track 202.

Figure 3:
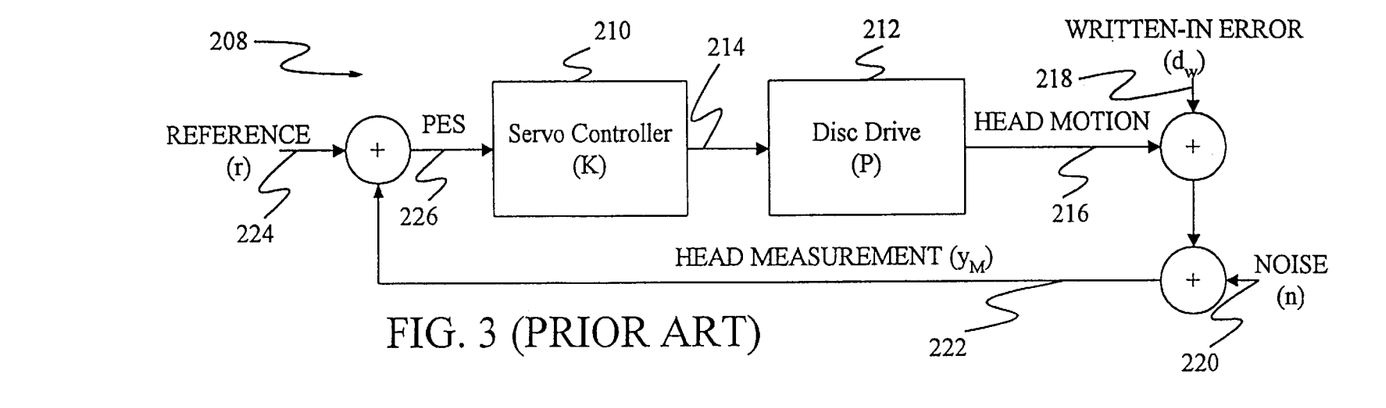
FIG. 3 is a block diagram of a prior art servo loop.

FIG. 3 is a block diagram of a servo loop 208 of the prior art. The servo loop includes a servo controller 210, having a gain of "K" and a disc drive 212 having a gain of "P". Servo controller 210 is the servo control circuitry within internal circuit 128 of FIG. 1. Disc drive 212 includes actuator assembly 122, voice coil motor 124, track accessing arm 120, suspension 118, and head gimbal assembly 112, all of FIG. 1.

Servo controller 210 generates a control current 214 that drives the voice coil motor of disc drive 212. In response, disc drive 212 produces head motion 216. In FIG. 3, the written-in error, d, is represented as a separate input signal 218 even though the written-in error would otherwise appear implicitly in head motion 216. The separation of written-in error 218 from head motion 216 provides a better understanding of the present invention. In addition, noise in the servo system has been separated and appears as noise 220, which is added to the head motion. The sum of head motion 216, written-in error 218 and noise 220 results in the head's servo measurement signal 222. Servo measurement signal 222 is subtracted from a reference signal 224, which is generated by internal circuitry 128 based on a desired location for the head. Subtracting head measurement 222 from reference signal 224 produces position error signal 226 which is input to servo controller 210.

The servo loop of FIG. 3 has a closed loop response that is calculated as:

$$y = \frac{PK}{1+PK}(r - n - d_w) \qquad \text{Equation 1}$$

where "y" is head motion 216, "P" is the gain of disc drive 212, "K" is the gain of servo controller 210, "r" is reference signal 224, "n" is noise signal 220, and "$d_w$" is the written-in error.

From Equation 1, it is clear that heads in servo loops of the prior art move in response to written-in errors. This movement is undesirable since it places the head outside of the ideally circular track path. Further, because the transfer function, PK/(1+PK), is frequency dependent, the transfer function suffers from peaking at certain frequencies. This peaking causes even greater position errors because it amplifies the written-in error at certain frequencies.

An alternative description of the response of the closed loop system of FIG. 3 is:

$$PES = \frac{1}{1+PK}(r - n - d_w) \qquad \text{Equation 2}$$

where PES is PES signal 226 of FIG. 3. Using Equation 2, an estimation of $d_w$ can be produced by ignoring reference signal 224 and noise signal 220 and only using the portions of position error signal 226 that are caused by repeatable runout error. This results in:

$$d_w = -\frac{R}{\frac{1}{(1+PK)}} \qquad \text{Equation 3}$$

where R is the repeatable runout portion of position error signal 226.

Figure 4:
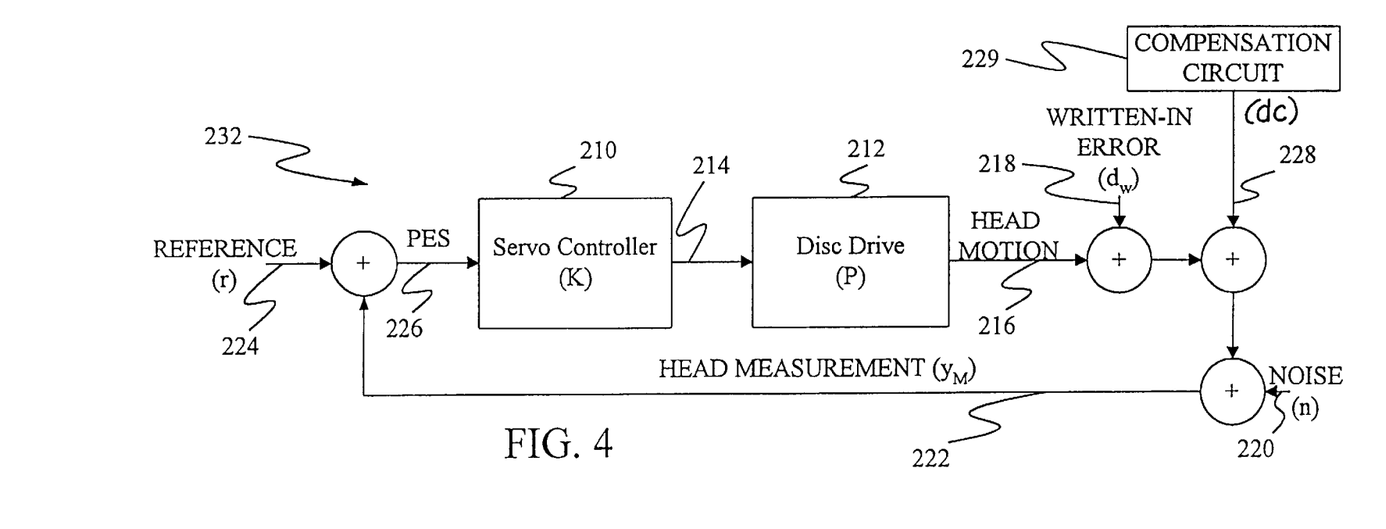
FIG. 4 is a block diagram of a servo loop of the present invention.

To eliminate the unwanted head motion created by the written-in error, the present invention adds a compensation signal to the servo loop of the prior art. This added signal is shown in servo loop 232 of the present invention, which is shown in FIG. 4. In FIG. 4, the elements that are common to FIG. 3 are numbered the same. The compensation signal added to the servo loop is compensation signal 228, which is produced by compensation circuitry (or servo compensator) 229. In FIG. 4, compensation signal 228 is inserted after the summation of written-in error 218 and head motion 216. However, those skilled in the art will recognize that the compensation signal can be added at other locations within the servo loop.

With the addition of compensation signal 228, the closed loop response of servo loop 232 is expressed as:

$$y = \frac{PK}{1+PK}(r - n - d_w - d_c) \qquad \text{Equation 4}$$

where $d_c$ is compensation signal 228. From Equation 4, it is apparent that the effects of written-in error, $d_w$, will be eliminated by compensation signal, $d_c$, if the compensation signal is equal to the negative of the written-in error.

Using equations 3 and 4 above, an estimation of the compensation signal, $d_c$, needed to eliminate the effects of written-in error, $d_w$, appears as:

$$d_c = \frac{R}{\frac{1}{(1+PK)}} \qquad \text{Equation 5}$$

where R is the repeatable runout component of the position error measurement.

In terms of frequencies, Equation 5 can be described as:

$$d_c(j\omega) = \frac{R(j\omega)}{\frac{1}{(1+PK)}(j\omega)} \qquad \text{Equation 6}$$

The compensation signal injected into the servo loop of the present invention is preferably a time-domain signal. Preferably, this time-domain signal is determined using the frequency domain relationship shown in Equation 6 to produce a frequency-domain compensation signal and transforming the resulting frequency-domain compensation signal into a time-domain compensation signal.

If disc 201 has N servo sectors (204,206, etc.) on each track, the sample rate $f_s$ is defined as:

$$f_s = 1/T_s = N \cdot RPM/60 \text{ Hz} \qquad \text{Equation 7}$$

where $T_s$ is the sample period and RPM is the rotations per minute of the disc. One aspect of the invention includes the recognition that the written-in error is periodic, with a period of $T_s$ which equals 60/(N·RPM) seconds. Because the signal is periodic, the spectrum of the written-in error ($d_w$) is uniquely defined by a Fourier series with discrete line spectra:

$$d_w(t) = \sum_{m=\infty}^{\infty} c_m e^{j\frac{2\pi m}{T_s}} = c_0 + 2\sum_{m=1}^{\infty} |c_m| \cos\left(\frac{2\pi m}{T_s}t + \phi_M\right) \quad \text{Equation 8}$$

where $c_m$ is the Fourier coefficient for each frequency component. With the additional constraint that $d_w$ is discrete-time with N samples, results in the Fourier series consisting of only N harmonically related exponential functions. (If the disc drive actuator is moving at frequencies which are above the Nyquist frequency ($f_s/2$ Hz), then these frequencies will be aliased below the Nyquist frequency when written into the disc surface). With this additional constraint, the spectrum of the written-in error, $d_w$ and the written-in correction, $d_c$ can be expressed as:

$$d_w(k) = \sum_{m=0}^{N-1} c_m e^{j\frac{2\pi m}{N}k} \quad \text{Equation 9}$$

$$d_c(k) = \sum_{m=0}^{N-1} b_m e^{j\frac{2\pi m}{N}k} \quad \text{Equation 10}$$

where $c_m$ are the Fourier coefficients of the written-in error $d_w$, and $b_m$ are the Fourier coefficients of the written-in compensation $d_c$.

Given these constraints regarding the spectrum of the written-in compensation $d_c$, it possible to examine the effects of decimation of $d_c$ in order to reduce the number of points of $d_c$. $d_c$ consists of N points. In accordance with one aspect of the present invention, it is desirable to reduce the number of points in $d_c$ without degrading the performance of the written-in compensation to less than an acceptable level. This is the equivalent of resampling $d_c$ at a lower sample rate, and then increasing the sample rate when the compensation is applied.

Figure 5:
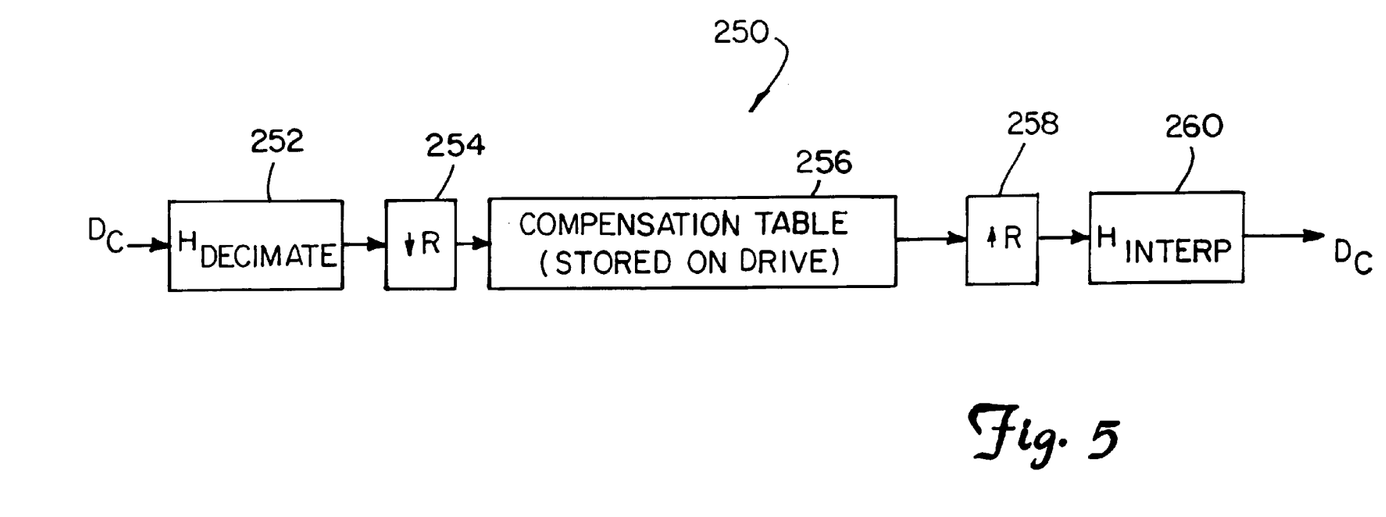
FIG. 5 is a block diagram of a resampling operation.

The resampling operation is shown in block diagram 250 of FIG. 5. The original written-in correction, $d_c$, is a discrete time signal of N points with a sample rate $f_s$ of $1/T_s$ or N·RPM/60 Hz. The decimated correction signal $d_c$ is a discrete-time signal of N/R points with a sample rate of (N/R)·(RPM/60) Hz. The decimation is performed once, when the compensation table is permanently stored, for example on the disc 106.

In FIG. 5, filter 252 performs a low pass filtering of the written-in correction value $d_c$ and eliminates any frequencies above the Nyquist frequency ($f_s/2R$ Hz). Next, decimation block 254 reduces the number of samples by R using R-fold decimation. Note that other decimation operations may be used in accordance with the invention. At block 254, only those samples that occur at times equal to integral multiples of R are kept and the remaining samples are discarded. This decimation operation results in the decimated correction signal, $d_c$, which has N/R points and a sample rate of $f_s/R$ Hz. The decimated correction values are stored in the disc 106 at block 256.

During readback, these values are recovered from block 256 and provided to expansion block 258. Expansion block 258 performs an R-fold expansion on the decimated signal $d_c$ according the equation:

$\beta(k)=d_c(k/R)$, if $k$ is an integral multiple of $R=O$,
otherwise, Equation 11 after expansion of the signal, interpolation block interpolates between the data points to smooth the signal and provide the resampled signal $d_c$, having N sample points and a sample rate of $f_s$. In one preferred embodiment, linear interpolation is used, however, any interpolation technique may be used in accordance with the invention. Blocks 258 and 260 are located in servo compensator 229 of FIG. 4.

Figure 6:
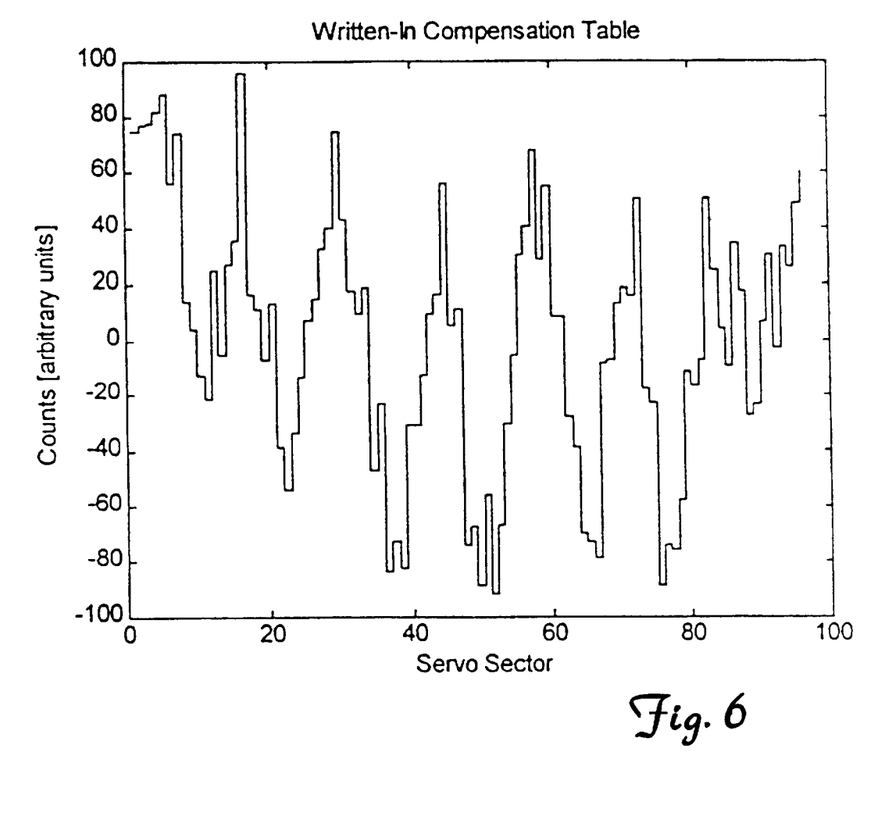
FIG. 6 is a graph of a written-in composition table.
Figure 7:
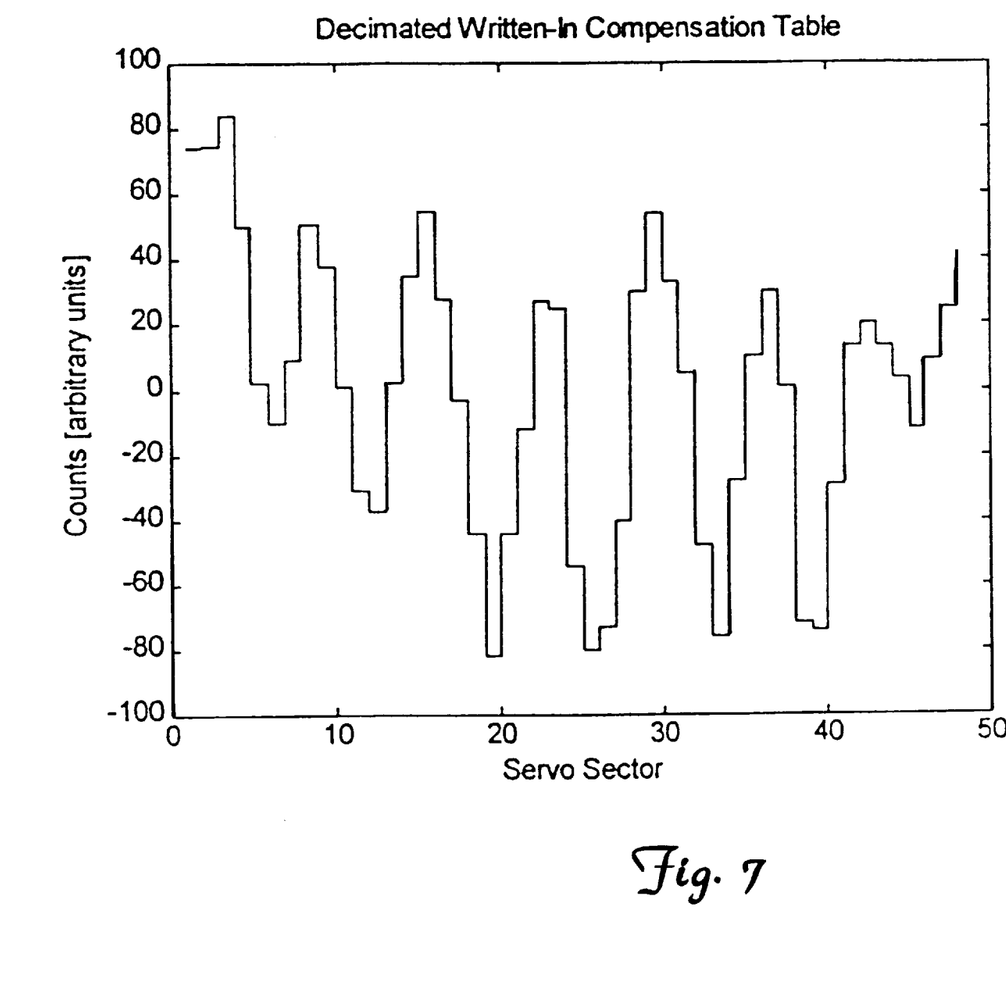
FIG. 7 is a graph of a written-in composition table.

The present invention results in a reduction in the total number of corrections which must be performed per track. For example, if data is collected from a drive having 96 servo sectors per track (N=96), and the sample rate of the drive is 16 kHz, corresponding to 10,000 RPM, the uncompensated repeatable runout (RRO), resulting from written-in error for the drive is 8.5 microinches. One written-in compensation technique described in co-pending U.S. patent application Ser. No. 09/106,443, was used to derive the compensation table as illustrated in FIG. 6. The repeatable runout with written-in compensation was 3.6 microinches or 42% of the original repeatable runout. Using the preferred resampling technique illustrated in FIG. 5, and setting R=2, the resulting decimated compensation table is illustrated at FIG. 7. The repeatable runout using the decimated compensation table of FIG. 7 was 3.9 microinches, or 46% of the uncompensated repeatable runout. This introduces an error of only 4% in comparison to the undecimated correction table of FIG. 6 a loss of only 0.3 microinches.

Aspects of the present invention include a disc drive 100 having a servo loop 232 for positioning a head 112 over a disc 106. The servo loop 232 includes a servo controller which generates a servo control signal 214 in response to a position error signal 226. An actuator 122 coupled to the servo controller 210 is capable of moving the head 112 in response to the servo control signal 214. A sensor, located in the head 112 is capable of sensing servo information located on the disc 106 and producing a servo signal 218 therefrom. The servo signal 218 is combined with a reference signal 224 to produce the position error signal 226. A compensation storage device 212 stores decimated compensation values. A servo compensator 229 is adapted to expand the decimated compensation values and inject the expanded compensation values 228 into the servo loop 232.

The compensation values are related to discrete time components in written-in repeatable runout. The servo compensator 229 includes an R-fold expander 258. R may be greater than 1 and in one embodiment R is 2. The servo compensator 229 includes an interpolator 260 adapted to interpolate between compensation values. The interpolator may comprise a linear interpolator. The disc 106 has N servo sectors 204, 206 per track and the number of decimated compensation values is less than N. In one aspect, the servo compensator 229 includes an R-fold expander 258 and the number of decimated compensation values is N/R. The compensation values are periodic.

Figure 8:
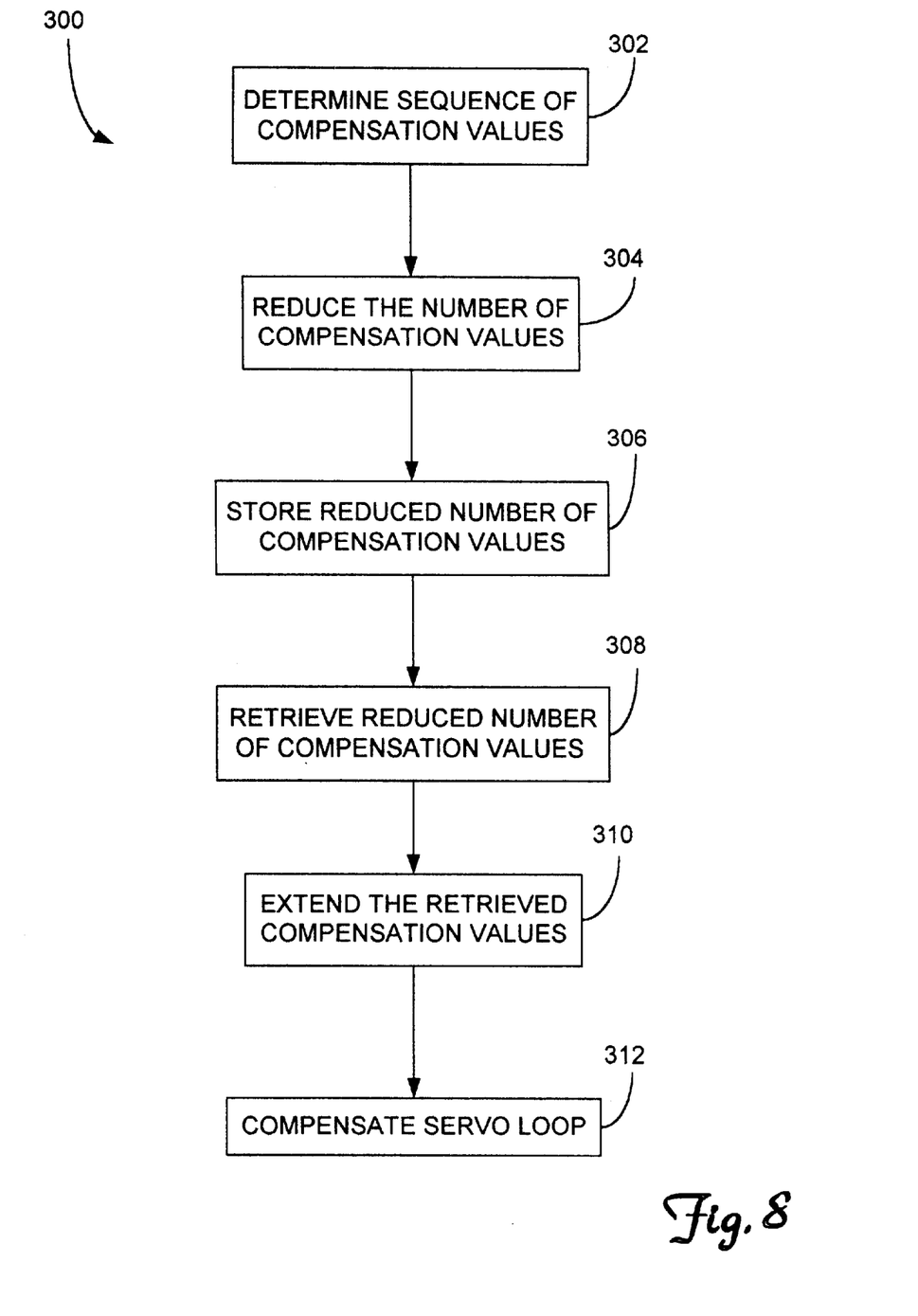
FIG. 8 is a simplified flow chart showing steps in accordance with the invention.

In another aspect of the invention, a method illustrated in flow chart 300 of FIG. 8 is provided for compensating for repeatable runout errors in a disc drive. The method includes determining a sequence of compensation values $d_w$ 302, reducing the number of compensation values in the sequence 304 and storing the reduced number of compensation values 306. The stored reduced number of compensation values are retrieved 308 and expanded 310. The expanded number of compensation values are provided to a servo loop 232 in the disc drive 100 at 312. The step of reducing 304 includes performing an R-fold decimation 254 and low pass filtering 252 between compensation values. The step of expanding 310 includes performing an R-fold expansion 258 and interpolating 260 between compensation values.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to a servo loop for a disc drive system, it will be appreciated by those skilled in the art that the teachings of the present invention can be applied to other systems, without departing from the scope and spirit of the present invention.

What is claimed is:

1. A storage device having a servo loop comprising:
   a servo compensator adapted to expand decimated compensation values that are to be used in the servo loop;
   wherein the servo compensator includes an R-fold expander with R greater than 1.

2. The storage device of claim 1 wherein the compensation values are related to discrete time components of a written-in runout.

3. The storage device of claim 1 wherein R is 2.

4. The storage device of claim 1 wherein the servo compensator includes an interpolator adapted to interpolate between compensation values.

5. The storage device of claim 4 wherein the interpolator comprises a linear interpolator.

6. The storage device of claim 1 including a disc having N servo sectors per track and the number of decimated compensation values is less than N.

7. The storage device of claim 6 wherein a number of decimated compensation values is N/R.

8. The storage device of claim 7 wherein the sample rate of the decimated compensation values is (N/R)·(RPM/60) cycles per second (Hz), where RPM is the number of rotations per minute of the disc.

9. The storage device of claim 1 wherein the compensation values are periodic.

10. The storage device of claim 1 wherein the decimated compensation values have been filtered to eliminate frequencies above a Nyquist frequency.

11. A method of compensating for repeatable runout errors in a storage device, comprising steps of:
   (a) determining a sequence of compensation values;
   (b) reducing the number of compensation values in the sequence by performing an R-fold decimation oh the compensation values with R greater than 1;
   (c) expanding the reduced number of compensation values; and
   (d) compensating a servo loop in the storage device based upon the expanded compensation values.

12. The method of claim 11 wherein the reducing step (b) includes low pass filtering the compensation values with a filter which eliminates frequencies above a Nyquist frequency.

13. The method of claim 11 wherein the expanding step (c) includes performing an R-fold expansion.

14. The method of claim 11 wherein the expanding step (c) includes interpolating between compensation values.

15. The method of claim 11 wherein the reducing step (b) reduces the number of compensation values by at least 50%.

16. The method of claim 11 wherein the storage device includes a disc having N servo sectors per track and the reduced number of compensation values is less than N.

17. The method of claim 16 wherein the reduced number of compensation value is N/R.

18. A servo controller for use in a disc storage system, the storage system of the type having a sensor configured to sense servo information on a disc surface and provide a servo signal and an actuator configured to position the sensor over the disc surface in response to a servo control signal, the servo controller comprising:
   a reference signal input to receive a reference signal indicative of a desired sensor position over the disc surface;
   a position error signal related to a difference between the reference signal and the servo signal;
   stored decimated servo compensation values; and
   a servo compensator configured to expand the decimated servo compensation values and inject servo compensation values into the servo control signal;
   wherein the servo compensator includes an R-fold expander with R greater than 1.

* * * * *

UNITED STATES PATENT AND TRADEMARK OFFICE
CERTIFICATE OF CORRECTION

PATENT NO. : 6,606,215 B1 Page 1 of 1
DATED : August 12, 2003
INVENTOR(S) : Kyle K. Eddy et al.

It is certified that error appears in the above-identified patent and that said Letters Patent is hereby corrected as shown below:

<u>Title page,</u>
Item [56], References Cited, OTHER PUBLICATIONS, delete "Bate" and insert -- Rate --.

<u>Column 8,</u>
Line 5, delete "oh" and insert -- on --.

Signed and Sealed this

Twentieth Day of April, 2004

JON W. DUDAS
*Acting Director of the United States Patent and Trademark Office*